July 20, 1943.  F. M. McLAUGHLIN  2,325,001
COLLAPSIBLE FORM
Filed June 6, 1942  2 Sheets-Sheet 1
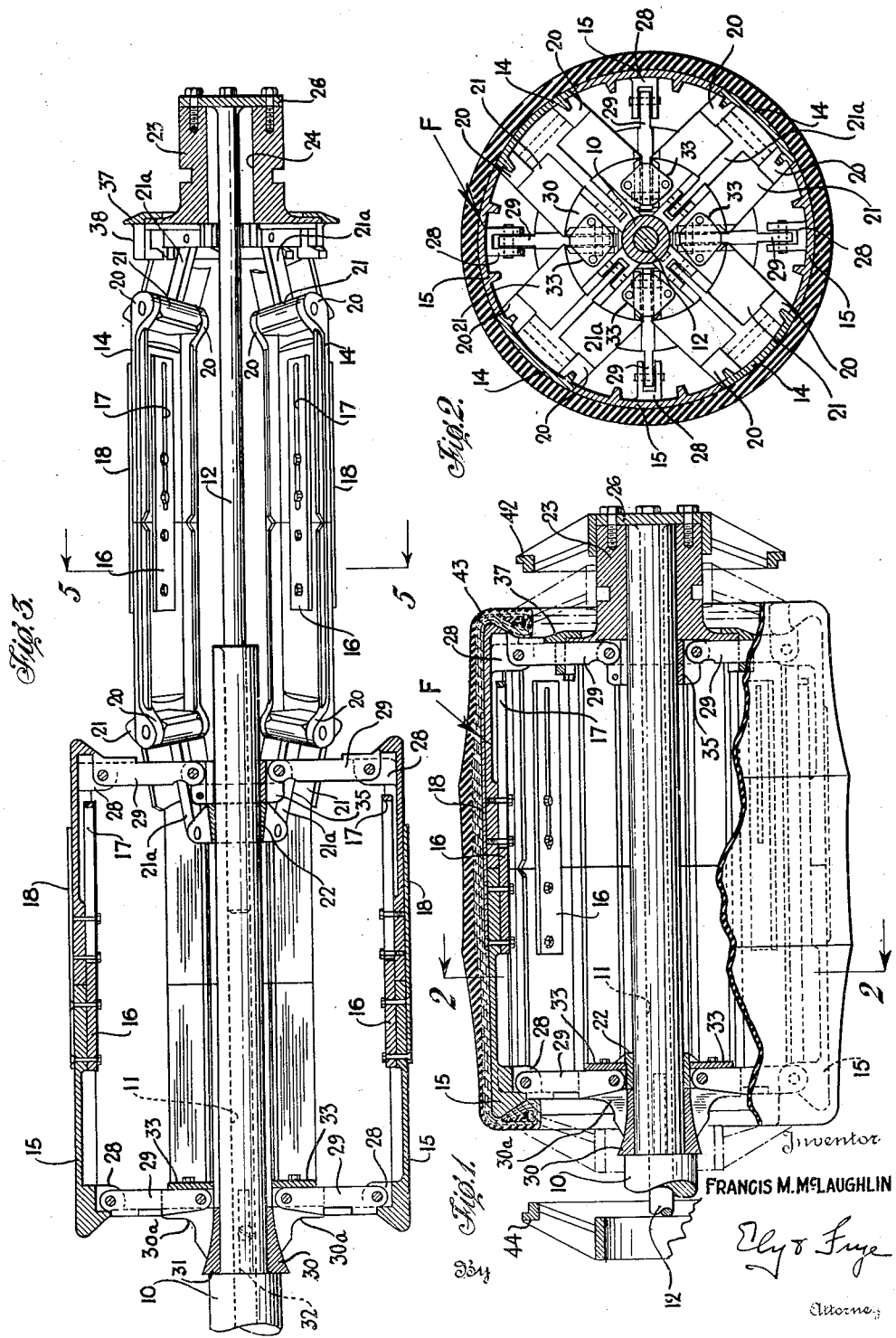
Inventor
FRANCIS M. McLAUGHLIN July 20, 1943.  F. M. McLAUGHLIN  2,325,001
COLLAPSIBLE FORM
Filed June 6, 1942  2 Sheets-Sheet 2
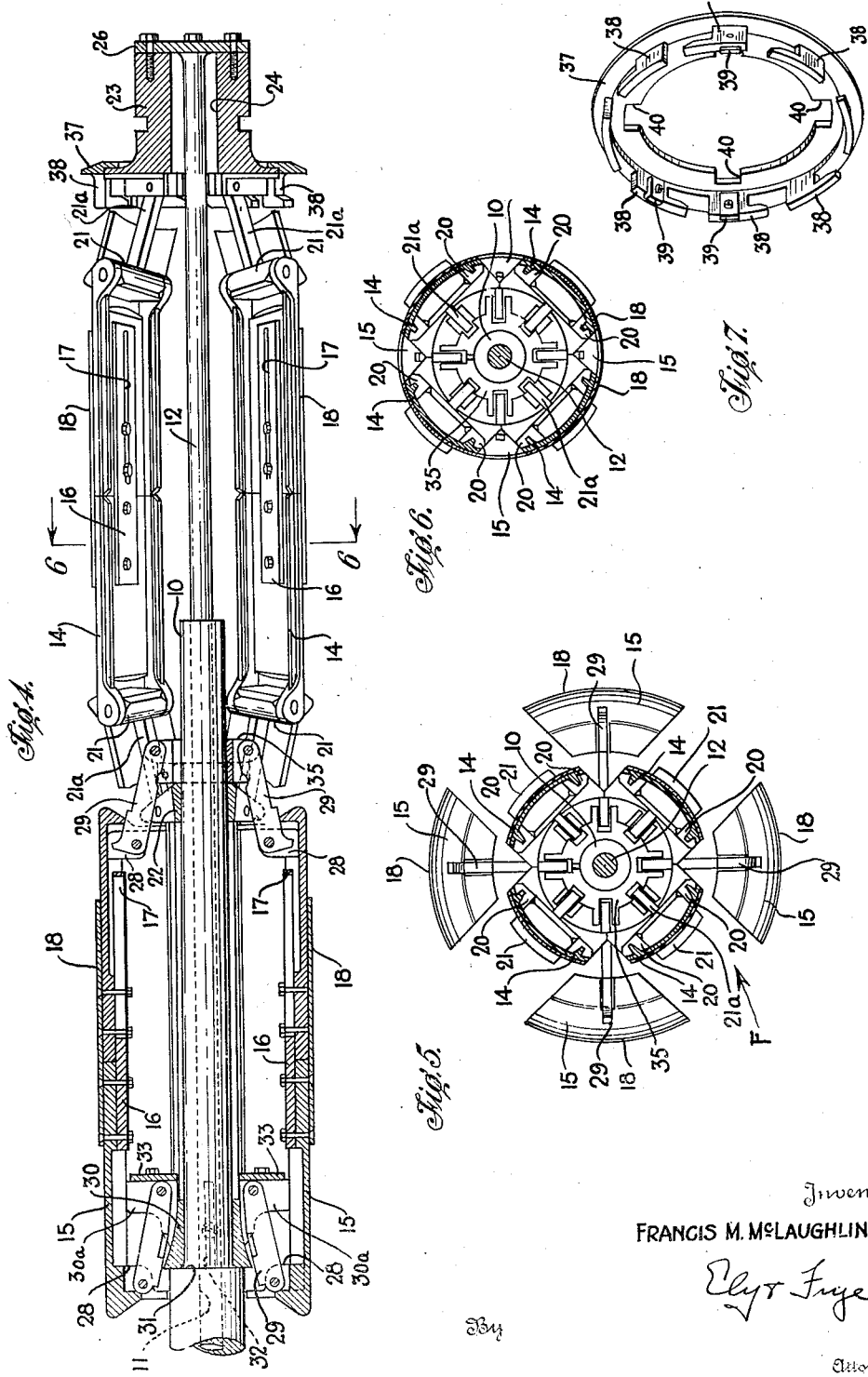
Inventor
FRANCIS M. McLAUGHLIN Patented July 20, 1943

2,325,001

UNITED STATES PATENT OFFICE 2,325,001

COLLAPSIBLE FORM

Francis M. McLaughlin, Akron, Ohio, assignor to The Firestone Tire & Rubber Company, Akron, Ohio, a corporation of Ohio Application June 6, 1942, Serial No. 446,121

7 Claims. (Cl. 154—9)

This invention relates to collapsible forms, and more especially it relates to collapsible forms or drums such as commonly are used in the manufacture of pneumatic tire casings.

Specifically, the form is of the segmental type comprising groups of radially movable sections of which one group is movable axially, as a unit, out of a tire built upon the form to the end that the form may be collapsed to the smallest possible compass. The invention is of especial utility in the manufacture of tires of relatively small bead diameter as compared to cross-sectional diameter, for example, the tires of airplane landing wheels.

The chief objects of the invention are to provide an improved collapsible form of the character mentioned; that is of relatively simple construction and provides accuracy of dimension; that readily may be altered for the manufacture of tires of different cross-sectional diameter; and that includes a relatively simple and easily operated interlock means for the elements of the two groups of sections so as to maintain the drum in expanded, operative condition. Other objects will be manifest as the description proceeds.

Of the accompanying drawings:

Fig. 1 is a longitudinal section of a collapsible tire building form embodying the invention, in expanded operative position, and a tire casing built thereon, a part being shown in elevation;

Fig. 2 is a transverse section on the line 2—2 of Figure 1;

Fig. 3 is a longitudinal diametric section of the form showing one group of form sections collapsed and moved out of the operative plane of the form;

Fig. 4 is a longitudinal diametric section of the form showing both groups of form sections in collapsed position;

Fig. 5 is a section on the line 5—5 of Fig. 3;

Fig. 6 is a section on the line 6—6 of Fig. 4; and

Fig. 7 is a perspective view of a locking element of the form.

Referring to the drawings, there is shown the outer end portion of a horizontal disposed quill or sleeve 10, which quill is a part of a tire building machine (not shown) and projects therefrom in the usual manner, there being an electrically driven motor (not shown) in the said tire building machine for rotating said quill under the control of an operator. The quill 10 is formed with an axial bore 11, and slidably mounted in said bore, for movement axially of the quill, is a spindle or pilot rod 12. The quill 10 and spindle 12 carry the improved collapsible form, the same being designated as a whole by the character F. The form F is of the type that has rounded end margins and has bead seating portions at its ends disposed radially inwardly of its perimeter.

As is clearly shown in Fig. 2, the form F comprises four key sections 14, 14, and four intermediate sections, 15, 15. All of said sections are of the type that are longitudinally extensible so as to enable lengthening of the form for the purpose of varying the length of a tire structure built thereon. To this end each of the form sections is centrally transversely divided, and each has an adjustment plate 16 secured to one of its divisions, on the under side thereof, and spanning the juncture of the two divisions, said plate being formed with a longitudinally extending slot 17 which receives suitable bolts that secure the plate adjustably to the other division of the section. On the peripheral face of each form section is a thin metal plate 18 that overlies the juncture of the two divisions of the section. Said plate 18 is secured to only one of the divisions of the section, the arrangement being such that the plate will cover the juncture of the section divisions in all positions of adjustment of the latter, thus providing a continuous working surface on the periphery of the expanded form.

Each key section 14 is formed at opposite ends with pairs of apertured ears 20, 20, and pivotally mounted in each pair of ears is an end plate 21, the end plates at opposite ends of each key section being substantially similar. As is best shown in Figs. 3 and 4, each end plate 21 comprises a portion of the rounded end margin of the form, including the radially inwardly disposed bead seating portion contiguous therewith, and a centrally disposed arm 21a on the back thereof, the free end of said arm, which is disposed radially innermost in the assembled form, being pivotally attached to a suitable supporting structure or hub. There are two of the latter, the same being disposed at opposite ends of the form sections 14. At the inner end of the form, that is, the end thereof nearest the tire building machine, the end-plate-arms 21a are pivotally connected to a spider-like hub 22 that comprises four radially extended slotted ears in which the ends of the arms 21a are received, said hub being slidably mounted upon the quill or sleeve 10 and capable of movement longitudinally thereof. At the opposite or outer end of the form the arms 21a of the end plates 21 thereat are pivotally mounted in respective pairs of slotted ears formed on the end face of an axially movable hub 23. Said hub is formed with an axial bore 24, and extending through said bore is the spindle or rod 12 that is slidably received in the bore 11 of the quill or sleeve 10. The outer end of spindle 12 is integrally formed with a flange 26, which flange is secured to the outer end face of the hub 23, the arrangement being such that the hub is supported by said spindle. The axial bore 24 of the hub 23 is of such size as to receive the outer end of the quill or sleeve 10 therein, as shown in Fig. 1, in the operative condition of the form.

Each intermediate section 15 of the form is formed at its opposite ends, centrally thereof and on the concave side thereof, back of the bead-seating portions of the section, with apertured ears 28, 28, and pivotally mounted in said ears are the outer ends of arms or links 29, the inner ends of said links being pivotally mounted in suitable supports or hubs. There are two of the latter of which one is designated 30, the same being mounted upon the quill or sleeve 10 abutting a shoulder 31 on the said sleeve. Movement of the hub 30 relatively of the sleeve 10 is prevented by a key 32, and a set screw that extends through the support and engages said key. The hub 30 is formed with four pairs of radially extending ears 30a, 30a in which the inner ends of the links 29 are received, and are pivoted for movement in planes that are disposed radially of the axis of the form. Stop-plates 33 secured to the respective pairs of ears 30a across the inwardly facing ends of the slots therein limit the pivotal angular movement of the links 29 between a position that is perpendicular to the axis of the form in the operative condition of the latter, as shown in Fig. 1, and an inclined position in the direction of the fixed end of the sleeve 10 in the collapsed or inoperative condition of the form as shown in Fig. 4. The ears 30a extend beyond or overhang the inwardly facing end of the hub 30, and stand in spaced relation to the surface of the sleeve 10. The arrangement is such that in the expanded or operative position of the form sections, the hub 22 of the key sections 14 will abut the hub 30 of the intermediate sections 15, with the ears 30a of the hub 30 extending over the hub 22. This is possible because the apertured ears 30a of hub 30 are angularly offset from the apertured ears of the hub 22, enabling the latter ears to be moved into position between the ears 30a, in which position of the hubs the links 29 and arms 21a are disposed in the same plane in the operative condition of the form shown in Fig. 1.

The links 29 at the opposite ends of the intermediate sections 15 have their inner ends pivotally mounted in respective pairs of apertured ears that extend radially from a hub 35. The latter is in the form of a split collar that is mounted upon the sleeve 10, near the outer end thereof, and is clamped thereto so as not normally to move relatively of said sleeve. The radial ears of hub 35 are in alignment with the radial ears of hub 30, and are angularly offset from the radial ears of hub 22 and hub 23. The arrangement is such that in the expanded, operative condition of the form, the hub 23 will abut hub 22, and the radial ears of hub 23 will be disposed between the radial ears of hub 22 so that the links 29 connected to the latter will be disposed in the same plane as the arms 21a of the end plates 21 of the key sections, as is evident in Fig. 4.

When the form is in the expanded operative position shown in Fig. 1, the links 29 are incapable of pivotal movement upon their hubs for the reason that the intermediate sections 15, to which said links are connected, are held fixedly in position by the key sections 14, as will be apparent in Fig. 2. This feature is utilized for preventing collapse of the key sections except when it is so desired. To this end a locking ring 37 is provided, which locking ring is mounted upon the hub 23. As is best shown in Fig. 7, the locking ring 37 is an annular disc or plate, one lateral face of which is integrally formed with eight arcuate locking lugs 38, 38, the latter being equally spaced apart and concentric with the axis of the ring. The confronting ends of adjacent lugs 38 are spaced sufficiently apart to receive a link 29 or an arm 21a, and the same end of each lug 38 is undercut to form a recess in which a link 29 or an arm 21a is receivable, said lugs thus having the shape of hook-like structures. The ring 37 is journaled upon the perimeter of hub 23 with the locking lugs 38 spanning said perimeter and projecting beyond so that the recesses in the lugs 38 are aligned with links 29 and arms 21a when said links and arms are disposed perpendicularly of the axis of the form, that is, in the operative position of the form as shown in Fig. 1. Retaining plates 39 are secured to the inner arcuate faces of some of the lugs 38 for retaining the ring 37 on the hub 23. The inner circumference of the ring is provided with four notches 40, 40 arranged in pairs at diametrically opposite points, said notches being for the purpose of engagement with a suitable tool, such as a spanner wrench (not shown) by which the ring is turned angularly about its axis to lock or to unlock the form.

As is shown in Fig. 1, the hub 23 may constitute a support for a bead setting ring 42, which ring is slidably and removably mounted thereon for axial movement between the position shown in full lines and the position shown in broken lines, to apply a bead core to a tire during the building of a tire on the form, said ring being removed curing the collapsing of the form and removal of a tire therefrom. Such a tire is shown at 43. A bead setting ring 44 also is provided at the opposite end of the form for setting a bead core at the opposite end of the tire, suitable means (not shown) being provided for supporting said ring 44 and for moving it between the full line position and the broken line position shown. The bead setting rings 42, 44 are not a part of the present invention so that a more detailed description thereof is not required.

The operation of the improved form is as follows: Assuming that the form is in the expanded condition shown in Fig. 1, it will be rotated by the rotation of the sleeve 10 driving through the hub 30 that is keyed thereto and the hub 35 fixedly clamped thereto. While the drum is rotating the tire 43 is built thereon in the usual manner as is well understood. Upon completion of the tire building operation, the drive of the sleeve 10 is stopped, and the form is prepared for removal of the tire therefrom. To this end the operator applies a spanner wrench to the locking ring 27 and turns the same angularly, relatively of the hub 23, until the spaces between adjacent ends of lugs or hooks 38 are in registry with links 29 and arms 21a. The operator then grasps the hub 23 and pulls it axially outwardly, with the result that the end plates 21 are turned angularly on their pivots on the key sections 14, and the latter are pulled inwardly toward the axis of the form. There may be some longitudinal movement of the key sections 14 during this operation, but the flexibility of the inturned end or bead portions of the tire structure enables the key sections to collapse as described. In fully collapsed position the key sections are in the position shown in Figs. 5 and 6, in which position their radially outermost parts are well within the compass of the inner circumference of the tire, at the bead portions thereof. The operator then resumes the pulling of the hub 23 axially outwardly with the result that the key sections move to the position shown in Figs. 3 and 4, in which position said sections are entirely out of the tire. Such movement of the key sections is limited by the fixed hub 35 which limits the axial movement of the hub 22 along the sleeve 10. The pilot rod 12 assists in the support of the key sections when they are in this position. The operator then manually pushes the tire axially toward the left as shown in Fig. 1, thus causing the intermediate sections 15 in the tire to be similarly moved. Such movement of the intermediate sections causes their supporting links 29 to tilt toward the left as shown, with the result that the sections 15 are moved inwardly toward the axis of the form, as shown in Figs. 4 and 6. In this position the sections 15 are well within the compass of the circumference of the tire 43 and the latter is easily removed from the form by moving it axially over the collapsed intermediate sections and the collapsed key sections. Thereafter the operations described are reversed to restore the form to expanded operative position. This expanding of the form is completed when the locking ring 37 is turned so that the locking lugs 38 engage with links 29 and arms 21a to secure the form in expanded condition. This completes a cycle of operations which may be repeated as often as a tire is built on the form.

The invention is simple in construction and simple to operate. Furthermore, the form is readily adapted to be elongated for the manufacture of different size tires, without requiring the substitution of different form elements.

Modification may be resorted to without departing from the spirit of the invention, or the scope thereof as defined by the appended claims.

What is claimed is:

1. In a collapsible tire building form, the combination of a group of key sections and a group of intermediate sections defining an annular structure when in operative position, end plates for the respective key sections pivotally connected thereto, respective hubs to which the end plates at opposite ends of the key sections are pivotally connected, individual supports for said hubs enabling the latter to move apart from each other to effect collapse of the key sections and enabling said hubs to move as a unit axially of the form to withdraw the collapsed key sections out of the operative plane of the form, and pivotal supports for the intermediate sections enabling the sections to be moved toward the axis of the form after the key sections have been moved out of the operative plane thereof.

2. A combination as defined in claim 1 in which the supporting structure for the form comprises a rotatable sleeve upon which the intermediate sections and one of the hubs of the key sections are supported, and a pilot rod disposed axially of the sleeve and slidable axially thereof supporting the other hub of the key sections.

3. In a collapsible tire building form, the combination of a group of key sections and a group of intermediate sections defining an annular structure when in operative position, a rotatable sleeve at the axis of the form, a pair of hubs fixedly mounted on said sleeve, links pivotally connecting the intermediate sections to said hubs, a pilot rod carried axially of the sleeve and movable axially relatively thereof, a hub slidably mounted for axial movement on said sleeve, a hub carried at the end of said pilot rod, and links connecting the last mentioned hubs to said key sections.

4. A combination as defined in claim 3 wherein the key-section-hub on the sleeve is disposed between the two intermediate-section-hubs thereon whereby one of the latter limits sliding movement of the key-section-hub axially of the sleeve.

5. In a collapsible tire building form, the combination of a group of key sections and a group of intermediate sections defining an annular structure when in operative position, a rotatable sleeve at the axis of the form, a pair of hubs fixedly mounted upon said sleeve, links swingable in one direction connecting the ends of the intermediate sections to respective hubs, a pilot rod carried within the sleeve and movable axially from one end thereof, a hub slidably mounted for axial movement on said sleeve, a hub carried at the outer end of said pilot rod, links connecting the respective last mentioned hubs to the ends of the key sections, the links at each end of the key sections being disposed in the same planes as the links at each end of the intermediate sections in the operative position of the form, and a locking member engaging the links of the key sections and intermediate sections at one end of the form for preventing collapse thereof.

6. A combination as defined in claim 5 wherein the locking member is mounted on the hub on the end of the pilot rod.

7. A combination as defined in claim 5 wherein the locking member is a ring journaled on the hub on the outer end of the pilot rod, concentrically thereof, said ring formed with laterally projecting hook-like lugs for engaging respective links at one end of the key sections and intermediate sections.

FRANCIS M. McLAUGHLIN.